W. H. SABIN & H. LARSON.
SCALE.
APPLICATION FILED SEPT. 27, 1910.
1,017,596.
Patented Feb. 13, 1912.
2 SHEETS—SHEET 1.
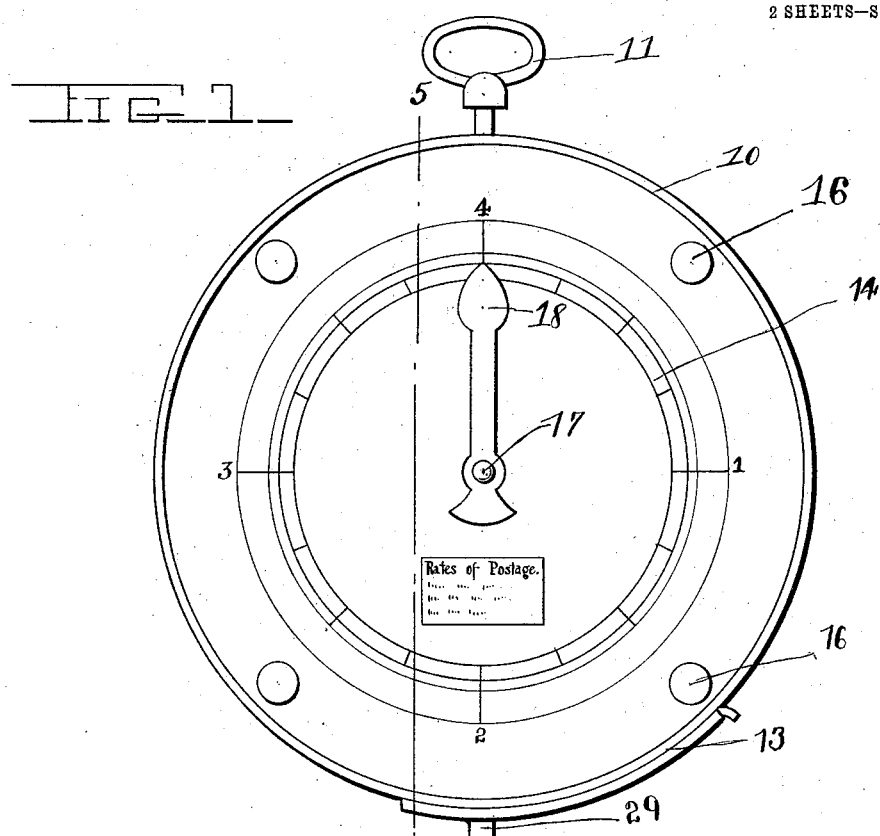
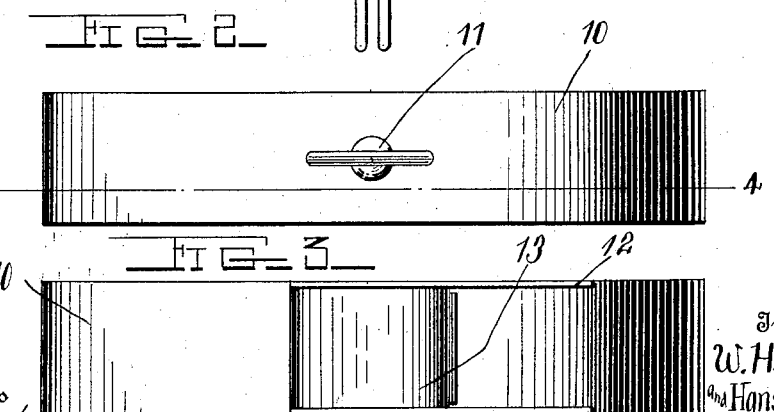
Witnesses
E H Brecke
C. N. Woodward.
Inventors
W. H. Sabin
and Hans Larson
By
Attorneys
COLUMBIA PLANOGRAPH CO., WASHINGTON, D. C.

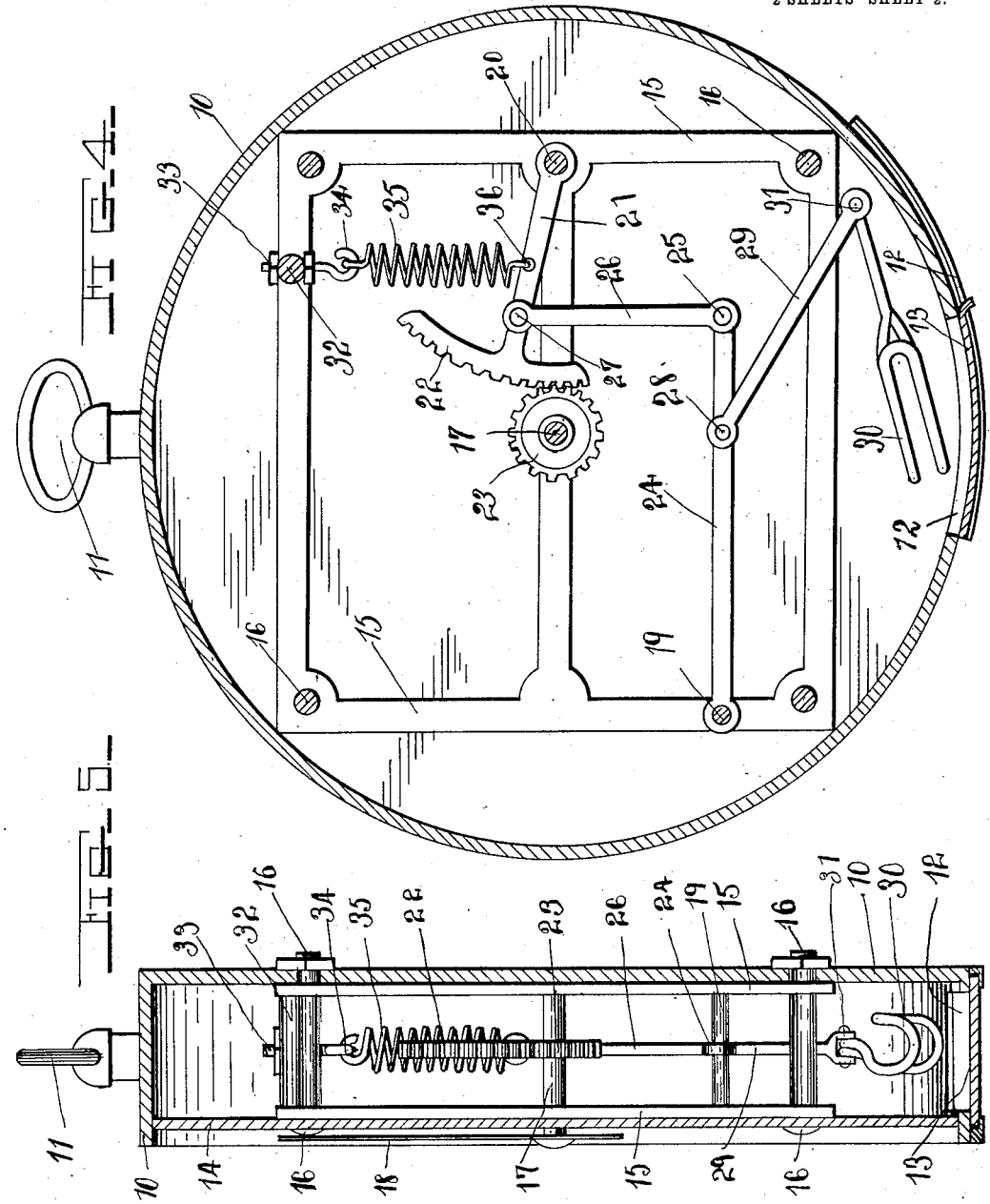

UNITED STATES PATENT OFFICE.

WALTER H. SABIN AND HANS LARSON, OF CROOKSTON, MINNESOTA.

SCALE.

1,017,596. Specification of Letters Patent. Patented Feb. 13, 1912.

Application filed September 27, 1910. Serial No. 584,083.

*To all whom it may concern:*

Be it known that we, WALTER H. SABIN and HANS LARSON, citizens of the United States, residing at Crookston, in the county of Polk, State of Minnesota, have invented certain new and useful Improvements in Scales; and we do hereby declare the following to be a full, clear, and exact description of the invention, such as will enable others skilled in the art to which it appertains to make and use the same.

This invention relates to weighing scales, more particularly to scales of relatively small size adapted to be carried in the pocket, and designed more particularly for weighing mail matter, and has for one of its objects to simplify and improve the construction and increase the convenience of devices of this character.

With this and other objects in view, the invention consists in certain novel features of construction hereinafter shown and described and then specifically pointed out in the claim; and, in the drawings illustrative of the preferred embodiment of the invention, Figure 1 is a side elevation of the improved scale. Fig. 2 is a top plan view. Fig. 3 is a bottom plan view. Fig. 4 is a section on the line 4—4 of Fig. 2. Fig. 5 is a section on the line 5—5 of Fig. 1.

The improved device comprises a casing 10 preferably in the form of a watch or small circular clock and provided with spaced sides arranged in parallel relations and with a suspending ring 11, the ring being preferably in the form of the ring portion of a watch. The casing 10 is provided in its lower side, or in the side opposite to the ring 11, with an opening 12 having a movable closure 13, the latter being preferably slidably arranged, so that the opening may be closed or opened as required. One of the flat faces of the casing 10 is provided with graduations represented at 14 and representing pounds and fractions of pounds. Any required number of the graduations may be employed but for ordinary purposes the capacity of the scale will be limited to four pounds, the usual limit for mail matter. For the convenience of the user, it is considered advantageous to emboss a table of postal rates 10' on the face of the dial.

Located within the casing 10 is a suitable frame 15 to which the weighing mechanism is connected. The frame 15 is detachably connected to the casing by screws or other suitable fastening devices 16. The frame 15 may be constructed in any suitable manner, and includes in its construction a main shaft or spindle 17 which extends at one end through the graduated face of the casing and is provided with a pointer 18 which operates over the graduations, as shown. The frame 15 likewise embraces in its construction two rods 19—20, the rods carrying the mechanism whereby the weight of the article will be transmitted to the shaft 17 and the pointer 18. Mounted for oscillation upon the rod 20 is an arm 21 having a gear segment 22 at its free end engaging a gear pinion 23 upon the shaft 17. Mounted for rotation upon the rod 19 is another arm 24, and connected at 25 to the free end of the arm 24 is a coupling rod 26, with the upper end of the coupling rod connected at 27 to the arm 21 near the segment 22. Connected at 28 to the rod 24 is a flexible member or link 29, the latter extending normally through the opening 12 of the casing. Suspended from the lower end of the link 29 is a supporting device for the mail matter which is to be weighed. This supporting device is preferably formed from a single piece of wire bent into double hook-like form 30 at one end and with eyes 31 at the other end, the eyes engaging in an aperture in the lower end of the flexible member. The hook 30 provides means for suspending the larger and more bulky articles, while the sides of the hook formed by the wire member provide means for the insertion of letters and like mailing matter, the friction between the sides of the hook being sufficient to support such articles.

Extending transversely of the frame 15 at its upper side is another rod 32, having a transverse aperture through which a pin 33 extends, the pin being threaded and provided with adjusting nuts upon each side of the rod. At its lower end the pin 32 is provided with a hook 34 to receive the upper end of a spring 35, the lower end of the spring being connected at 36 to the arm 21. By threading the pin 33 and providing it with the adjusting nuts the pin may be adjusted to control the tension of the spring 35, and thus enable the spring to be adjusted to cause the accurate operation of the weighing mechanism. The spring provides the necessary "balance" to the weighing device, in the ordinary manner. The aperture 12 is of sufficient size so that the suspending device 30 and the link 29 may be folded into the casing and the slide 13 closed when the scale is not in use.

As before stated, the casing will be relatively small, not necessarily larger than an ordinary watch, and when not in use may be carried in the pocket, hence the necessity for the means whereby the hook 30 and the link 29 may be disposed within the casing when the scale is being transported.

The improved device is simple in construction, can be manufactured of any suitable material and will be found convenient for purposes of weighing mail matter, and may be readily transported in the pocket.

What is claimed is:—

In a weighing scale, a casing having a graduated dial and with an opening in one of its walls, a frame secured in said casing, a shaft journaled in said frame and extending through the casing, a pointer carried by the shaft and operating over said dial, a pinion also carried by said shaft, an arm pivotally mounted on said frame and having at one end a segment gear meshing with said pinion, a second arm pivoted by one end to said frame, a link connecting the free end of said second arm with the first mentioned arm intermediate the length of the latter, a spring connected to maintain said arms yieldably in one position, means for adjusting said spring, a flexible member connected to said last mentioned arm and extending through the casing aperture, and a supporting device connected to said flexible member.

In testimony whereof, we affix our signatures in presence of two witnesses.

WALTER H. SABIN.
HANS LARSON.

Witnesses:
C. M. LUMPKIN,
TH. WALLACE.

---

Copies of this patent may be obtained for five cents each, by addressing the "Commissioner of Patents, Washington, D. C."